(12) United States Patent
Lee et al.

(10) Patent No.: US 11,597,317 B2
(45) Date of Patent: Mar. 7, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Seunghwan Lee, Suwon-si (KR); Hyun Song, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 280 days.

(21) Appl. No.: 17/013,038

(22) Filed: Sep. 4, 2020

(65) Prior Publication Data
US 2021/0178963 A1 Jun. 17, 2021

(30) Foreign Application Priority Data
Dec. 16, 2019 (KR) .......................... 10-2019-0168202

(51) Int. Cl.
| | |
|---|---|
| *B60Q 3/80* | (2017.01) |
| *B60N 2/00* | (2006.01) |
| *B60Q 3/20* | (2017.01) |
| *B60Q 3/51* | (2017.01) |
| *B60K 35/00* | (2006.01) |
| *B60Q 3/60* | (2017.01) |

(52) U.S. Cl.
CPC ................ *B60Q 3/80* (2017.02); *B60K 35/00* (2013.01); *B60N 2/002* (2013.01); *B60Q 3/20* (2017.02); *B60Q 3/51* (2017.02); *B60Q 3/60* (2017.02); *B60K 2370/149* (2019.05); *B60K 2370/771* (2019.05)

(58) Field of Classification Search
CPC ... B60Q 3/80; B60Q 3/20; B60Q 3/51; B60K 35/00; B60N 2/002
See application file for complete search history.

(56) References Cited

U.S. PATENT DOCUMENTS

| | | | | |
|---|---|---|---|---|
| 10,712,816 | B2* | 7/2020 | Rao ...................... | G06V 20/597 |
| 10,940,790 | B1* | 3/2021 | Mazuir ................... | F21V 14/04 |
| 2014/0241534 | A1* | 8/2014 | Zielinski ................ | H03G 5/165 |
| | | | | 381/57 |
| 2015/0197193 | A1* | 7/2015 | Oba ......................... | B60Q 3/80 |
| | | | | 315/80 |
| 2016/0152178 | A1* | 6/2016 | Peterson .................. | B60Q 3/80 |
| | | | | 315/77 |
| 2017/0124987 | A1* | 5/2017 | Kim ...................... | G06V 20/593 |

(Continued)

OTHER PUBLICATIONS

Seung Hwan Lee et al., A Study on Expanded Space Perception in Autonomous Vehicle, Hyundai Motor Company Academic Conference, Oct. 15, 2019; pp. 1-5.

*Primary Examiner* — Tracie Y Green
(74) *Attorney, Agent, or Firm* — Lempia Summerfield Katz LLC (57) ABSTRACT

A vehicle includes: a seat; a sensor part provided on the seat and detecting whether a user is seated on the seat; a lighting part provided in the vehicle and including a plurality of light sources disposed at a preset interval; and a controller configured to determine a gaze direction of the user based on a result of the detection of the sensor part and to selectively control the plurality of light sources to distort the preset interval based on the determined gaze direction of the user.

16 Claims, 6 Drawing Sheets

(56) References Cited

U.S. PATENT DOCUMENTS

| | | | | |
|---|---|---|---|---|
| 2018/0086259 A1* | 3/2018 | Bel | ...................... | H05B 47/105 |
| 2018/0312106 A1* | 11/2018 | Tatara | ...................... | B60Q 1/26 |
| 2019/0171014 A1* | 6/2019 | Chen | .................. | G02B 27/0172 |
| 2021/0208409 A1* | 7/2021 | Hong | ...................... | B60K 35/00 |

* cited by examiner

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2019-0168202, filed on Dec. 16, 2019 in the Korean Intellectual Property Office, the disclosure of which is incorporated herein by reference.

BACKGROUND

1. Field

The disclosure relates to a method of controlling an interior space and interior lighting of a vehicle.

2. Description of the Related Art

A vehicle refers to a device for moving a user or an object through a driving force. Recently, the interior space of the vehicle is not merely considered a space where users stay during transportation. There have been various studies on lighting for providing users with comfort and pleasure.

Most of the existing studies focus on gaze processing of a driver to prevent the driver's driving from being disturbed. In addition, the sense of space and openness in the vehicle have been mainly studied on the driver's seat and studied only to a level of diversifying arrangement patterns and colors of lights.

In addition, projection-based lighting has been only studied on the sense of proportion or hidden structure. Research on functional characteristics of projection-based lighting has not been conducted in particular.

Concept cars to be used in the autonomous driving era show an example of vehicle travel in which users face each other and share an interior space. In this situation, the users' gazes are not directed to the outside, but are directed to different directions including an interior wall surface and a ceiling, i.e., a roof of the vehicle. Having different gaze directions of users represents securing more spaces in each direction. Thus, when users' positions are restricted on a certain seat due to limitation of movement during autonomous driving, the space where the users' gazes are kept directed may require lighting handling.

SUMMARY

Therefore, it is an object of the disclosure to provide a vehicle capable of providing a user with a sense of openness by adjusting a varied-line spacing of lights provided in the vehicle, and a method of controlling the same.

Additional aspects of the disclosure are set forth in part in the description which follows and, in part, should be understood from the description or may be learned by practice of the disclosure.

It is an aspect of the disclosure to provide a vehicle including: a seat; a sensor part provided on the seat and detecting whether a user is seated on the seat; a lighting part provided in the vehicle and including a plurality of light sources disposed at a preset interval; and a controller configured to determine a gaze direction of the user based on a result of the detection of the sensor part and to selectively control the plurality of light sources to distort the preset interval based on the determined gaze direction of the user.

The controller may reduce the interval of the plurality of light sources with respect to the user seated on the seat.

The controller may select a light source that is to emit light based on an angle and a height of the seat.

The seat may include a first seat provided to have a first gaze direction and a second seat provided to have a second gaze direction. The controller may select a plurality of first light sources based on the first gaze direction and a plurality of second light sources different from the plurality of first light sources based on the second gaze direction.

The controller may control a color of the plurality of first light sources to be different from a color of the plurality of second light sources.

The lighting part may be positioned on a roof or a headlining of the vehicle. The roof or the headlining of the vehicle may be provided in a form of an embossment.

The lighting part may be positioned on a roof or a headlining of the vehicle. The roof or the headlining of the vehicle may include two or more planes that are not parallel to each other.

The plurality of first light sources may be positioned on a plane different from a plane on which the plurality of second light sources are positioned, among the two or more planes. In other words, the plurality of first light sources may be positioned on a first plane of the two or more planes and the plurality of second light sources may be positioned on a second plane of the two or more planes, the second plane being different from the first plane.

The lighting part may include a plurality of grooves arranged at the preset interval, the plurality of grooves having the plurality of light sources inserted thereinto.

It is another aspect of the disclosure to provide a vehicle including: a seat; a sensor part provided on the seat and detecting whether a user is seated on the seat; a projector provided in the vehicle and transmitting a plurality of light strings to a headlining or a roof of the vehicle; and a controller configured to determine a gaze direction of the user based on a result of the detection of the sensor part and to control a preset interval between the plurality of light strings to be distorted based on the determined gaze direction.

The controller may reduce an interval between the plurality of light strings with respect to the user seated on the seat.

It is another aspect of the disclosure to provide a vehicle including: a seat; a sensor part provided on the seat and detecting whether a user is seated on the seat; a display positioned on a roof or a headlining of the vehicle and outputting light string images; and a controller configured to determine a gaze direction of the user based on a result of the detection of the sensor part and to control an interval between the light string images with respect to the seated user.

It is another aspect of the disclosure to provide a method of controlling a vehicle including a seat and a lighting part. The lighting part is provided on a roof at an inside of the vehicle and has a plurality of light sources arranged at a preset interval. The method includes: detecting whether a user is seated on the seat; determining a gaze direction of the user based on a result of the detection of the sensor part; and selectively controlling the plurality of light sources to distort the preset interval based on the determined gaze direction.

The controlling may include reducing the interval of the plurality of light sources with respect to the user seated on the seat.

The controlling may include selecting a light source that is to emit light based on an angle and a height of the seat.

The seat may include a first seat provided to have a first gaze direction and a second seat provided to have a second gaze direction. The controlling may include selecting a plurality of first light sources based on the first gaze direction and a plurality of second light sources different from the plurality of first light sources based on the second gaze direction. The controlling may also include individually controlling the plurality of first light sources and the plurality of second light sources.

The controlling may include controlling a color of the plurality of first light sources to be different from a color of the plurality of second light sources.

The lighting part may be positioned on a roof or a headlining of the vehicle. The roof or the headlining of the vehicle may be provided in a form of an embossment.

The lighting part may include a plurality of grooves arranged at the preset interval. The plurality of grooves may have the plurality of light sources inserted thereinto.

The lighting part may further include a display configured to transmit a plurality of light strings. The controlling may include controlling the display to reduce an interval between images of the plurality of light strings.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure are described. Description of elements commonly known in the art or that overlap each other in the embodiments have been omitted. The terms as used throughout the specification, such as "~ part", "~ module", "~ member", "~ block", and the like, may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It is further understood that the term "connect" or its derivatives refer both to direct and indirect connection. The indirect connection includes a connection over a wireless communication network.

It is further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

In the specification, it is understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure are described with reference to the accompanying drawings.

When an element or component, such as the controller, in the written description and/or claims is identified and described as having a purpose or performing or carrying out a stated function, step, set of instructions, or the like, the element or component may also be considered as being "configured to" do so.

Figure 1:
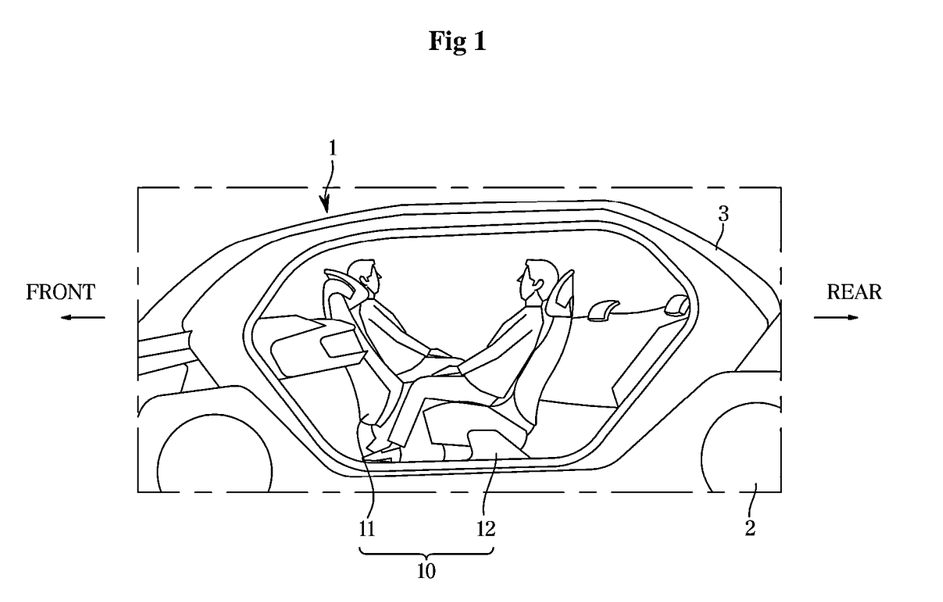
FIG. 1 is a view schematically illustrating a vehicle and the interior of the vehicle according to the disclosure.

FIG. 1 is a view schematically illustrating a vehicle 1 and the interior of the vehicle 1 according to the disclosure.

Referring to FIG. 1, the vehicle 1 may include vehicle wheels 2 moving the vehicle 1 and a vehicle body 3 forming the external appearance thereof. The vehicle body 3 may form the external appearance of the vehicle 1 and allow the user to board (i.e., occupy) the interior space of the vehicle 1.

The inside of the vehicle 1 may include a seat 10. The vehicle 1 according to the disclosure may be a vehicle autonomously driving toward a destination without specific driver manipulation. Therefore, the vehicle 1 may not have a driver's seat provided for the user to look ahead. In other words, the seat 10 may be provided inside the vehicle 1 so that the user has various gaze directions.

According to the disclosed embodiment, the seat 10 may include a first seat 11 and a second seat 12. The number of the seats 10 is not limited thereto. According to an embodiment, the first seat 11 and the second seat 12 may be provided so that users seated thereon have different gaze directions.

The seat 10 detects whether the user is seated thereon. According to the detection result, the vehicle 1 controls lights provided in the vehicle 1.

Figure 2:
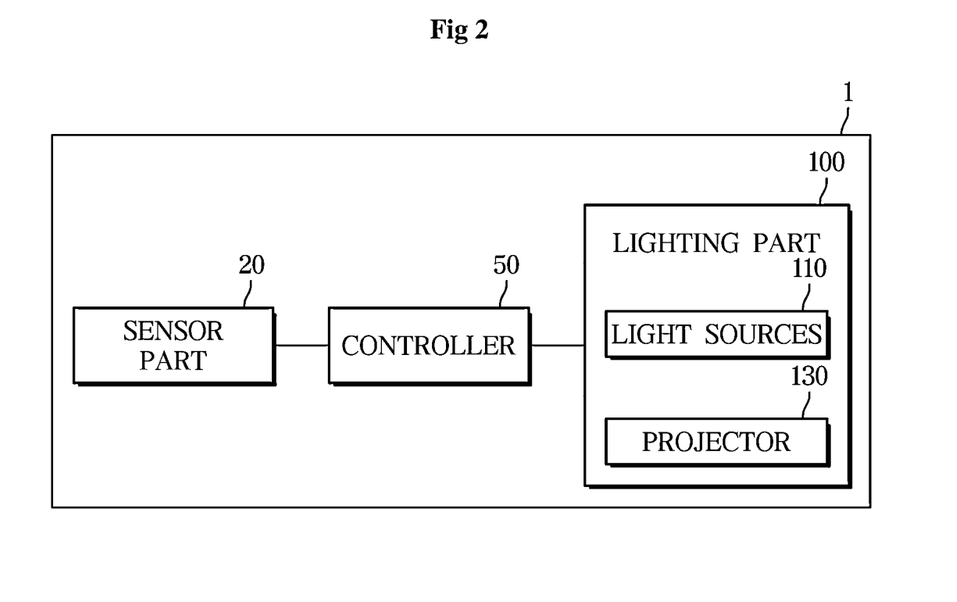
FIG. 2 is a control block diagram illustrating a vehicle according to an embodiment of the disclosure.

FIG. 2 is a control block diagram illustrating a vehicle according to an embodiment of the disclosure.

Referring to FIG. 2, the vehicle 1 is provided with a sensor part 20 for detecting whether a user is seated, a lighting part 100 provided at an inside of the vehicle 1 and illuminating the inside of the vehicle 1, and a controller 50 controlling the overall operation of the vehicle 1.

The sensor part 20 is provided on the seat 10 to detect whether a user is seated on the seat 10. In detail, the sensor part 20 may include various sensors, such as a pressure sensor that detects pressure, an infrared sensor that detects a certain distance, a camera that captures an image of the inside of a vehicle, and the like. The sensor part 20 changes the detected result into an electrical signal. The electrical signal is transmitted to the controller 50. Based on the electrical signal, the controller 50 determines whether a user is seated.

On the other hand, the sensor part 20 does not need to be provided on the seat 10, as long as it can be provided inside the vehicle 1 and detect boarding of the user.

The controller 50 may include a memory (not shown) for storing data regarding an algorithm for controlling the operations of the components of the vehicle 1 or a program that represents the algorithm. The controller 50 may also include a processor (not shown) that performs the above described operations using the data stored in the memory. In this case, the memory and the processor may be implemented as separate chips. Alternatively, the memory and the processor may be implemented as a single chip.

The controller 50 according to an embodiment determines a gaze direction of the user based on the detection result of the sensor part 20. In detail, when a user is seated on the first seat 11, the controller 50 may determine that the user has a first gaze direction directed to the rear of the vehicle 1. When a user is seated on the second seat 12, the controller 50 may determine that the user has a second gaze direction directed to the front of the vehicle 1.

The controller 50 controls the lighting part 100 based on the determined gaze direction. In detail, the controller 50 controls the lighting part 100 so that the user is provided with a perception that the interior space is enlarged (hereinafter, referred to as a sense of openness). With such a configuration, the vehicle 1 may provide comfort and stability to a user during transportation, especially during transportation that takes a long time. A detailed example of the controller 50 controlling the lighting part 100 is described below with reference to other drawings.

The lighting part 100 includes a plurality of light sources 110 and a projector 130. The lighting part 100 provides a user with a sense of openness through control of the controller 50. The lighting part 100 may be provided inside the vehicle 1.

The plurality of light sources 110 may be provided at an upper side or a lateral side of the interior of the vehicle 1 at a predetermined interval. The controller 50 provides a sense of openness by emitting only some of the light sources among the plurality of light sources 110 according to a gaze direction of a user.

The lighting part 100 may provide various types of lighting shapes, such as point light, line light, and planar light according to the shape of the plurality of light sources 110.

For example, the lighting part 100 may include a plurality of light sources 110 transmitting point light. The plurality of light sources 110 provided as point light sources may be attached to the roof of the vehicle 1 in the form of embossments. As another example, the lighting part 100 may include a plurality of light sources 110 provided as line light sources for transmitting light strings. In addition, the lighting part 100 may be a device provided as a display device and displaying a light string image. In other words, the lighting part 100 may be provided in various types of devices, as long as it can display point light, line light, and planar light at a predetermined interval.

The projector 130 is provided inside the vehicle and may transmit a plurality of light strings to the headlining or the roof of the vehicle. The projector 130 may transmit the light strings while adjusting the spacing of the plurality of light strings under the control of the controller 50 so that the intervals of the light strings are reduced as being distant from the position of the user.

The vehicle 1 may further include various configurations in addition to the above configurations. In addition, the lighting part 100 may further include various display devices capable of improving the sense of openness of the interior of the vehicle 1 in addition to the plurality of light sources 110 and the projector 130.

Figure 3:
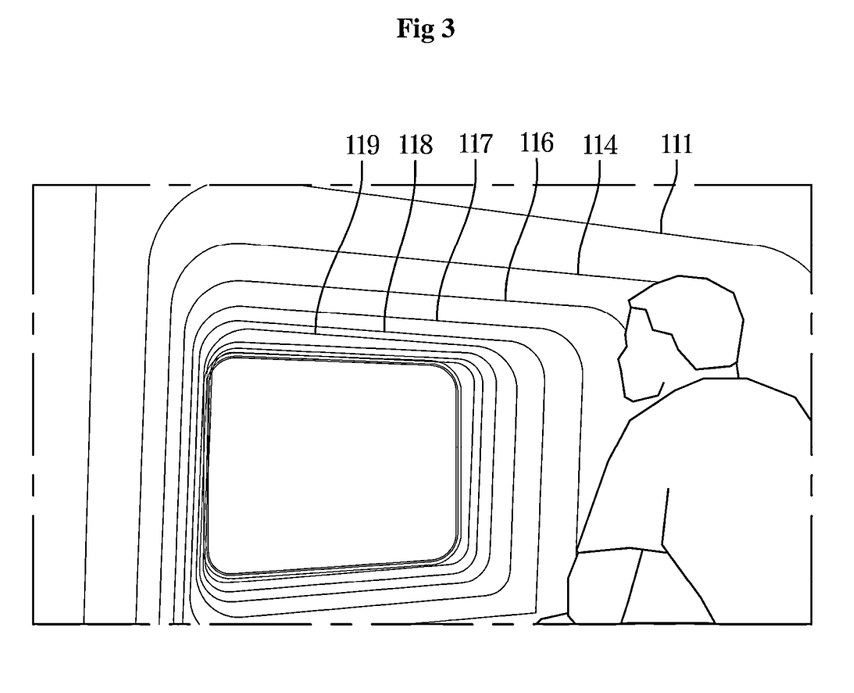
FIG. 3 is a view for describing an embodiment of improving the sense of openness.

FIG. 3 is a view for describing an embodiment of improving the sense of openness.

The lighting part 100 selectively controls lighting of the plurality of light sources 110 that emits light in the gaze direction of the user.

Referring to FIG. 3, the lighting part 100 may include a plurality of light sources 111-119 emitting light strings. The controller 50 turns on a first light source 111 that is adjacent to the user and a fourth light source 114 among the plurality of light sources 111-119. In addition, the controller 50 turns on a sixth light source 116 to provide an interval smaller than the interval between the first light source 111 and the fourth light source 114. The controller 50 turns on seventh, eighth, and ninth light sources 117, 118, and 119, respectively.

With such a configuration, the vehicle 1 may improve a sense of openness in the gaze direction of the user.

On the other hand, the lighting part 100 does not need to be provided with a plurality of line light sources emitting light strings. For example, the lighting part 100 may be provided as a large display device and display light strings under the control of the controller 50.

Figure 4:
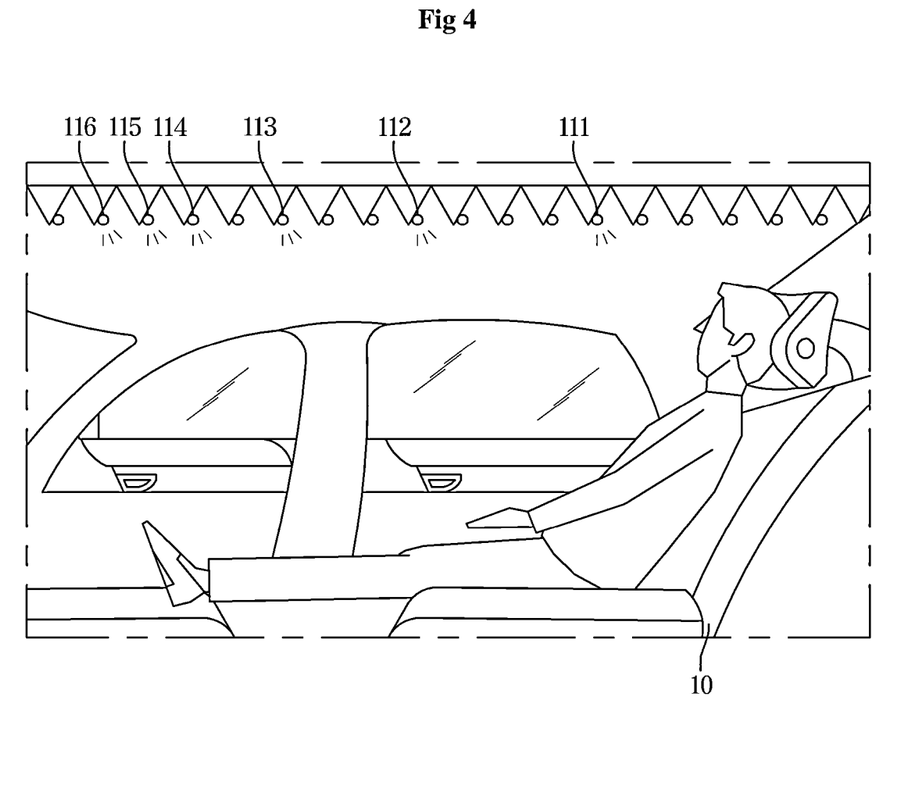
FIG. 4 is a view for describing another embodiment of improving the sense of openness.

FIG. 4 is a view for describing another embodiment of improving the sense of openness.

Referring to FIG. 4, the vehicle 1 according to an embodiment may include a lighting part 100 provided in the form of an embossment on an upper side of the interior of the vehicle 1. In each section provided in the emboss shape, a plurality of light sources 110 may be provided.

When it is determined that a user is seated on the seat 10, the controller 50 determines a gaze direction. As illustrated in FIG. 4, the user's gaze direction may be directed to the front of the vehicle 1.

The controller 50 may turn on a first light source 111 in consideration of the position and the gaze direction of the seat 10 where a user is seated. The controller 50 may turn on a second light source 112 by excluding (i.e., not turning on) three light sources ahead of the first light source 111 (i.e., between the first light source 111 and the second light source 112). The controller 50 may turn on a third light source 113 by excluding two light sources ahead of the second light source 112. The controller 50 may turn on a fourth light source 114 by excluding one light source ahead of the third light source 113. The controller 50 may also turn on a fifth light source 115 and a sixth light source 116 without excluding light sources. In other words, the controller 50 reduces the interval of the light emitting light sources with respect to the seat 10 on which the user is seated.

The controller 50 may change or select a light emitting light source in consideration of the angle and height of the seat 10. For example, when the user shown in FIG. 4 lowers the height of the seat 10, the controller 50 does not turn on the first light source 111 and turns on the second light source 112 to the sixth light source 116 based on the gaze direction that varies with the lowered height of the seat 10.

The embossed shape disclosed in FIG. 4 is only an example. For example, the roof or headlining of the vehicle 1 may be provided to include two or more planes not parallel to each other. The lighting part 100 may be arranged to have a preset interval on the two or more planes that are not parallel to each other. As another example, the roof of the vehicle 1 may be provided with grooves at a preset interval. The lighting part 100 may be provided to be inserted into each groove.

Figure 5:
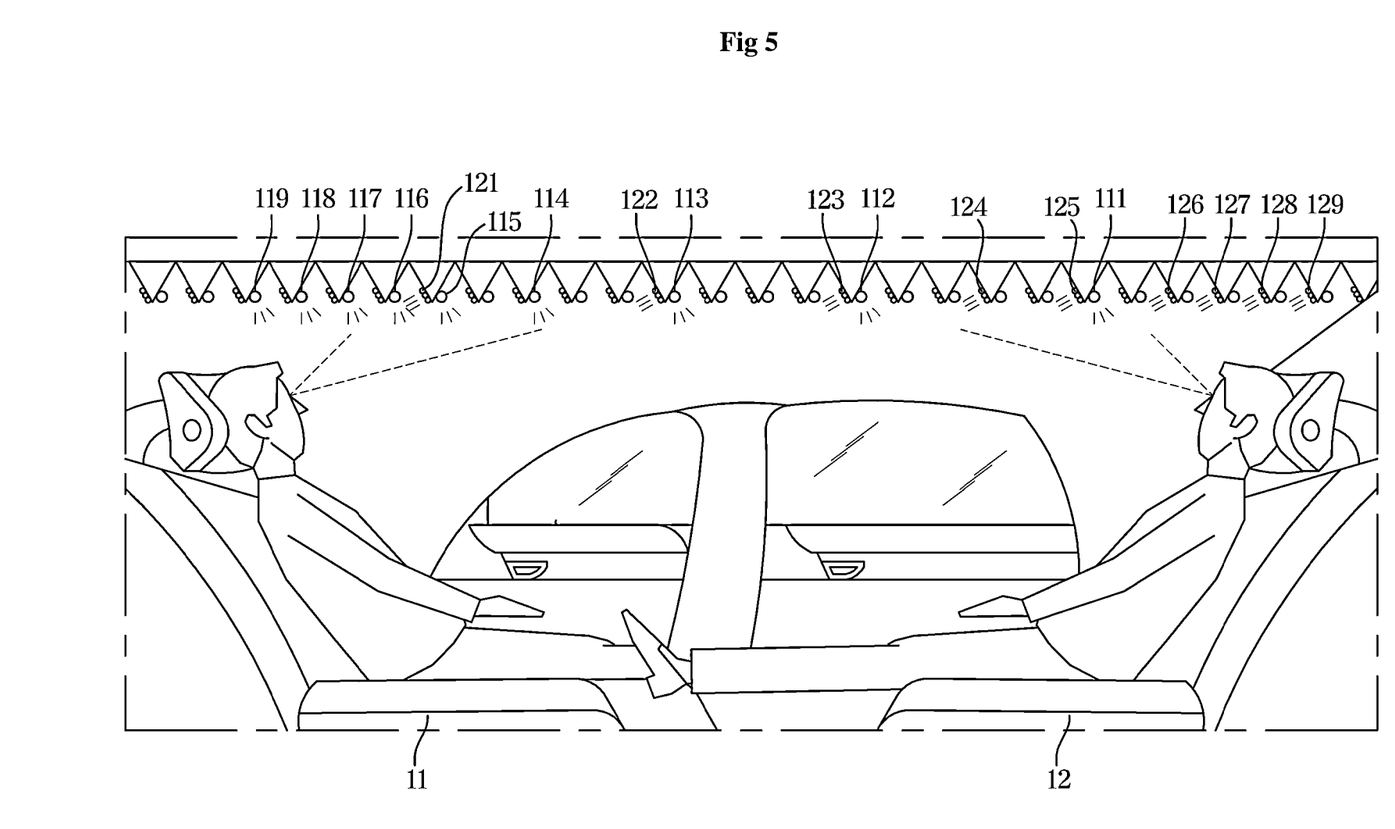
FIG. 5 is a view for describing an embodiment in which a plurality of users occupy a vehicle.

FIG. 5 is a view for describing an embodiment in which a plurality of users occupy a vehicle.

Referring to FIG. 5, the vehicle 1 may have two users each seated on either side of the vehicle 1 on the first seat 11 and the second seat 12. The users may have different gaze directions according to the positions where the first seat 11 and the second seat 12 are provided.

As shown in FIG. 5, a plurality of light sources 110 may be provided on different planes on a roof provided in the form of embossment. In the following description, the plurality of light sources 110 are divided into a plurality of first light sources 110a and a plurality of second light sources 120.

In detail, the plurality of second light sources 120 may be provided on a surface facing the front of the vehicle 1 for the user seated on the first seat 11. In addition, the plurality of first light sources 110a may be provided on a surface facing the rear of the vehicle 1 for the user seated on the second seat 12.

Upon determining that a user is seated on the first seat 11, the controller 50 determines a light source that is to emit light among the plurality of second light sources 120 in consideration of the first gaze direction and the height of the first seat 11. In detail, the controller 50 turns on first to ninth light sources 121-129 among the plurality of second light sources 120 based on the first gaze direction. In other words, with respect to the first seat 11, the controller 50 selects the plurality of second light sources 120 to emit light and allows intervals of the light sources to decrease.

Upon determining that a user is seated on the second seat 12, the controller 50 determines a light source that is to emit light among the plurality of first light sources 110a in consideration of the second gaze direction and the height of the second seat 12. In detail, the controller 50 turns on first to ninth light sources 111-119 among the plurality of first light sources 110a based on the second gaze direction. In other words, with respect to the second seat 12, the controller 50 selects the plurality of first light sources 110a to emit light and allows intervals of the light sources to decrease.

In the vehicle 1 according to the disclosure, each user with a different gaze direction is prevented from seeing the lighting pattern for the user on the opposite side so that the sense of openness of the space is prevented from being reduced due to interference of light.

Similar to FIG. 4, the embodiment of FIG. 5 is not limited to the embossed shape. For example, the lighting part 100 may be manufactured in a form in which a light source is inserted into a small groove in the vehicle body 3. As another example, the lighting part 100 may adjust the colors and emission patterns of the plurality of first light sources 110a for the first gaze direction and the plurality of second light sources 120 for the second gaze direction.

Figure 6:
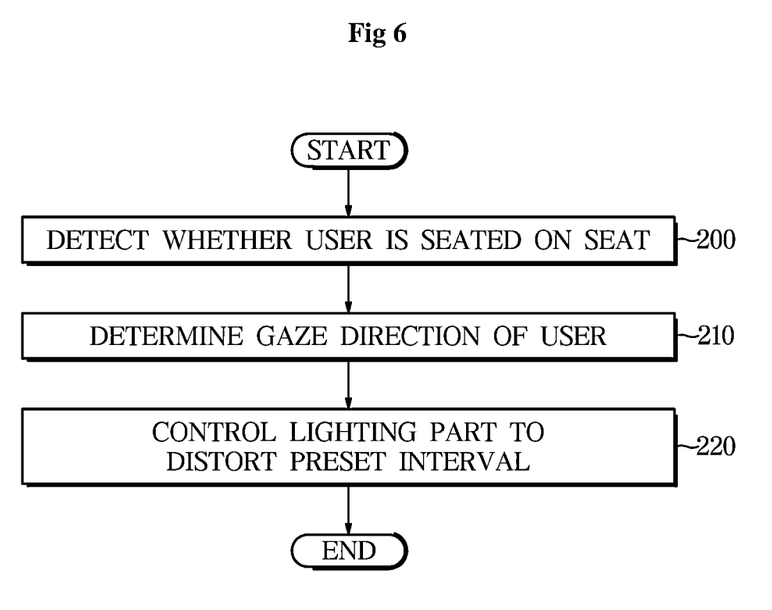
FIG. 6 is a flowchart showing a method of controlling a vehicle.

FIG. 6 is a flowchart showing a method of controlling a vehicle.

Referring to FIG. 6, the sensor part 20 detects whether a user is seated on the seat 10 (200).

The sensor part 20 may include a pressure sensor or an infrared sensor. The sensor part 20 may transmit a detected signal to the controller 50. As another example, the sensor part 20 may include a camera that captures an image of the inside of the vehicle 1 and transmits the image to the controller 50. The controller 50 may determine a seat 10 on which a user is seated through the image.

The controller 50 determines a gaze direction of the user (210).

The controller 50 may determine the gaze direction of the user based on the seat 10 on which the user is seated. As another example, the controller 50 may also determine the gaze direction of the user based on the height of the seat 10 and the detected size of the user. When the sensor part 20 transmits an image captured through the camera to the controller 50, the controller 50 may consider the size and height of eyes of the user.

The controller 50 controls the lighting part 100 so that a preset interval is distorted (220).

For example, the lighting part 100 may include a plurality of light sources 110 provided at a preset interval. The controller 50 decreases the interval between light sources emitting light among the plurality of light sources 110. In other words, the number of light sources emitting light in a region adjacent to the seat 10 is less than the number of light sources emitting light in a region distant from the seat 10.

As another example, the lighting part 100 may include a projector 130. The controller 50 controls the projector 130 so that the interval at which the projector 130 transmits light strings decreases with respect to the seat 10.

The controller 50 may change the pattern and color of the light emitted by the lighting part 100 in consideration of the user's preference stored in advance.

With such a configuration, the vehicle 1 may provide a sense of openness to the user, and through the sense of openness of the interior space of the vehicle 1, provide a sense of stability to the user who rides in the vehicle 1 for a long time. In addition, the vehicle 1 may improve individual satisfaction by controlling the lighting part 110 differently according to vehicles having various internal structures and the tastes of individuals.

As is apparent from the above, the vehicle and the method of controlling the same can provide a user with a sense of openness by adjusting a varied-line spacing of lights provided in the vehicle.

One aspect of the disclosure can provide a sense of stability to a user boarding the vehicle for a long time through a sense of openness of the interior space of the vehicle.

Another aspect of the disclosure can be applied to various interior structures of vehicles by adjusting lights according to varying gaze directions of a user and can provide a user with an optimum effect through individual light controls.

What is claimed is:

1. A vehicle comprising:
   a first seat provided to have a first gaze direction and a second seat provided to have a second gaze direction;
   a sensor part provided on the first seat and the second seat and detecting whether a user is seated on the first seat and the second seat;
   a lighting part provided on a roof of the vehicle and including a plurality of light sources disposed at a preset interval, wherein the plurality of light sources includes a plurality of first light sources provided on a surface facing a rear of the vehicle for a user seated on the second seat and a plurality of second light sources, different from the plurality of first light sources, provided on a surface facing a front of the vehicle for a user seated on the first seat; and
   a controller configured to selectively control the plurality of second light sources and the plurality of first light sources to distort the preset interval based on the first gaze direction and the second gaze direction, respectively, when the sensor part detects a user is seated on the first seat or the second seat, respectively.

2. The vehicle of claim 1, wherein the controller reduces the interval of the plurality of second light sources and the plurality of first light sources with respect to users seated on the first seat and second seat, respectively.

3. The vehicle of claim 1, wherein the controller selects a light source that is to emit light based on an angle and a height of the first seat or the second seat.

4. The vehicle of claim 1, wherein the controller controls a color of the plurality of first light sources to be different from a color of the plurality of second light sources.

5. The vehicle of claim 1, wherein the lighting part is positioned on the roof or a headlining of the vehicle, and
wherein the roof or the headlining of the vehicle is provided in a form of an embossment.

6. The vehicle of claim 1, wherein the lighting part is positioned on the roof or a headlining of the vehicle, and
wherein the roof or the headlining of the vehicle includes two or more planes that are not parallel to each other.

7. The vehicle of claim 6, wherein the plurality of first light sources are positioned on a plane different from a plane on which the plurality of second light sources are positioned, among the two or more planes.

8. The vehicle of claim 1, wherein the lighting part includes a plurality of grooves arranged at the preset interval, the plurality of grooves having the plurality of light sources inserted thereinto.

9. A method of controlling a vehicle comprising a first seat provided to have a first gaze direction and a second seat provided to have a second gaze direction, a sensor part provided on the first seat and the second seat, and a lighting part provided on a roof at an inside of the vehicle, the lighting part including a plurality of light sources arranged at a preset interval, wherein the plurality of light sources includes a plurality of first light sources provided on a surface facing a rear of the vehicle for a user seated on the second seat and a plurality of second light sources, different from the plurality of first light sources, provided on a surface facing a front of the vehicle for a user seated on the first seat, the method comprising:
detecting, by the sensor part, whether a user is seated on the first seat and the second seat; and
selectively controlling the plurality of second light sources and the plurality of first light sources to distort the preset interval based on the first gaze direction and the second gaze direction, respectively, when the sensor part detects a user is seated on the first seat or the second seat, respectively.

10. The method of claim 9, wherein the controlling includes reducing the interval of the plurality of second light sources and the plurality of first light sources with respect to users seated on the first seat and second seat, respectively.

11. The method of claim 9, wherein the controlling includes selecting a light source that is to emit light based on an angle and a height of the first seat or the second seat.

12. The method of claim 9, wherein the controlling includes controlling a color of the plurality of first light sources to be different from a color of the plurality of second light sources.

13. The method of claim 9, wherein the lighting part is positioned on the roof or a headlining of the vehicle, and
wherein the roof or the headlining of the vehicle is provided in a form of an embossment.

14. The method of claim 9, wherein the lighting part includes a plurality of grooves arranged at the preset interval, the plurality of grooves having the plurality of light sources inserted thereinto.

15. The method of claim 9, wherein the lighting part further includes a display configured to transmit a plurality of light strings, and
wherein the controlling includes controlling the display to reduce an interval between images of the plurality of light strings.

16. The vehicle of claim 1, wherein the lighting part further includes a display configured to transmit a plurality of light strings, and
wherein the controller controls the display to reduce an interval between images of the plurality of light strings.

* * * * *